(12) United States Patent
Schiller (10) Patent No.: US 8,640,890 B2
(45) Date of Patent: Feb. 4, 2014

(54) BAG RACK SYSTEM

(76) Inventor: Andrew J. Schiller, Prospect, KY (US)

( * ) Notice: Subject to any disclaimer, the term of this patent is extended or adjusted under 35 U.S.C. 154(b) by 197 days.

(21) Appl. No.: 13/177,471

(22) Filed: Jul. 6, 2011

(65) Prior Publication Data

US 2012/0006777 A1   Jan. 12, 2012

Related U.S. Application Data

(60) Provisional application No. 61/398,874, filed on Jul. 6, 2010.

(51) Int. Cl.
*A47G 29/00* (2006.01)
*A47B 57/42* (2006.01)
*A47B 57/52* (2006.01)

(52) U.S. Cl.
USPC ....... 211/85.15; 211/12; 211/193; 211/94.02; 211/87.01

(58) Field of Classification Search
USPC ............ 211/193, 100, 85.15, 12, 87.01, 70.6, 211/85.7, 63, 18, 70.5, 90.02, 94.02, 211/106.01, 123, 124, 105.1–105.6; 248/683, 692, 100, 205.5, 206.2, 248/206.3, 304, 305, 309.3, 339
See application file for complete search history.

(56) References Cited

U.S. PATENT DOCUMENTS

| | | | | |
|---|---|---|---|---|
| 640,736 | A | * | 1/1900 | Biester ............................ 211/19 |
| 2,483,844 | A | * | 10/1949 | Ranseen ......................... 248/99 |
| 2,988,315 | A | * | 6/1961 | Saxe ......................... 248/220.22 |
| 4,077,554 | A | * | 3/1978 | Goode ........................... 224/559 |
| 4,108,313 | A | * | 8/1978 | Bogar, Jr. ......................... 211/64 |
| 4,226,348 | A | | 10/1980 | Dottor et al. |
| 4,267,997 | A | | 5/1981 | Meier |
| 4,316,591 | A | | 2/1982 | Muraoka |
| 4,333,575 | A | * | 6/1982 | Wong ............................ 211/118 |
| 4,364,534 | A | | 12/1982 | Valesko |
| 4,367,819 | A | * | 1/1983 | Lewis ......................... 211/59.1 |
| D273,159 | S | | 3/1984 | Adamson et al. |
| 4,469,300 | A | | 9/1984 | Valesko |
| 4,498,652 | A | | 2/1985 | Malik |
| 4,537,377 | A | | 8/1985 | Shewchuk |
| 4,657,295 | A | | 4/1987 | Holem |
| 4,684,087 | A | | 8/1987 | Spickard |
| 4,723,743 | A | | 2/1988 | Jenkins |
| D296,045 | S | | 6/1988 | Holem |
| 4,838,504 | A | * | 6/1989 | Bittenbinder ................. 248/100 |
| D302,062 | S | | 7/1989 | Sable |
| 4,854,456 | A | * | 8/1989 | Lee ................................ 211/14 |
| 4,860,982 | A | | 8/1989 | Berlant |
| 4,892,224 | A | | 1/1990 | Graham |
| 4,915,330 | A | | 4/1990 | Buckley |
| 4,919,546 | A | | 4/1990 | Imazeki et al. |
| 4,921,193 | A | | 5/1990 | Benesch |
| 4,925,056 | A | | 5/1990 | McCoig |
| 4,930,734 | A | | 6/1990 | Schmidt |
| 4,930,735 | A | | 6/1990 | Lax |

(Continued)

*Primary Examiner* — Jennifer E Novosad
(74) *Attorney, Agent, or Firm* — Middleton Reutlinger; Chad D. Bruggeman; John F. Salazar (57) ABSTRACT

A bag rack system adapted to hang a bag by its handles in the open position. The bag rack system includes a pair of spaced mounts or brackets. Each bracket includes an arm releasably secured to a base. The base can be attached to a top, bottom, or vertical surface of an object while the arms are repositionable relative to the base to maintain a horizontal position. Each arm includes a cleating structure to maintain the bag in the open position.

21 Claims, 7 Drawing Sheets

(56) References Cited

U.S. PATENT DOCUMENTS

| | | | |
|---|---|---|---|
| D309,565 S | 7/1990 | Newman et al. | |
| 4,957,252 A | 9/1990 | Watkins | |
| 4,997,116 A * | 3/1991 | Grim | 224/493 |
| 4,997,149 A | 3/1991 | Koch | |
| 4,998,694 A * | 3/1991 | Barteaux | 248/100 |
| 5,005,791 A | 4/1991 | Lanzen | |
| 5,018,691 A | 5/1991 | King | |
| 5,078,279 A * | 1/1992 | Hancock et al. | 211/64 |
| D323,968 S | 2/1992 | Blocker et al. | |
| 5,092,546 A * | 3/1992 | Wolfbauer | 248/49 |
| 5,092,548 A | 3/1992 | Bayes et al. | |
| 5,163,645 A | 11/1992 | Caruso | |
| 5,222,702 A | 6/1993 | Olmos | |
| 5,275,363 A * | 1/1994 | Dennis | 248/101 |
| D345,069 S | 3/1994 | Green | |
| 5,314,151 A | 5/1994 | Carter-Mann | |
| 5,372,346 A * | 12/1994 | Upchurch et al. | 248/304 |
| 5,427,288 A | 6/1995 | Trubee | |
| D362,386 S | 9/1995 | Blocker | |
| D362,621 S | 9/1995 | Blocker | |
| 5,465,845 A | 11/1995 | Norby et al. | |
| 5,520,316 A * | 5/1996 | Chen | 224/539 |
| D371,023 S | 6/1996 | Higgins | |
| 5,535,914 A | 7/1996 | Badalamenti et al. | |
| 5,639,051 A | 6/1997 | Surbeck | |
| D380,670 S | 7/1997 | Blocker | |
| 5,671,861 A | 9/1997 | Hall et al. | |
| 5,711,499 A | 1/1998 | Sectish | |
| D393,766 S | 4/1998 | Mazzola et al. | |
| 5,765,789 A | 6/1998 | Ryon et al. | |
| 5,881,901 A | 3/1999 | Hampton | |
| 5,915,584 A | 6/1999 | Sposit et al. | |
| 6,003,820 A | 12/1999 | Baldonado et al. | |
| 6,041,945 A | 3/2000 | Faraj | |
| D422,891 S | 4/2000 | Ohlman, II | |
| 6,059,126 A | 5/2000 | Miller | |
| 6,076,782 A | 6/2000 | Alderman | |
| 6,152,408 A | 11/2000 | O'Grady | |
| 6,325,341 B1 | 12/2001 | Brown | |
| 6,367,746 B1 | 4/2002 | Webb et al. | |
| 6,375,131 B1 | 4/2002 | Youst | |
| 6,402,104 B1 | 6/2002 | Smith | |
| 6,460,814 B1 | 10/2002 | Bolick | |
| 6,517,033 B2 | 2/2003 | Russell et al. | |
| 6,609,689 B1 * | 8/2003 | Knapp | 248/205.5 |
| 6,637,707 B1 * | 10/2003 | Gates et al. | 248/224.7 |
| D482,831 S | 11/2003 | Lemos | |
| D489,618 S | 5/2004 | Startek | |
| 6,817,581 B1 * | 11/2004 | McAllister | 248/95 |
| 6,824,182 B2 | 11/2004 | Graham | |
| 6,857,528 B2 | 2/2005 | Klein et al. | |
| 6,931,817 B2 | 8/2005 | Reed | |
| 7,028,962 B1 * | 4/2006 | Hostetler | 248/309.3 |
| 7,118,001 B2 | 10/2006 | Klein et al. | |
| 7,201,282 B1 * | 4/2007 | Alderman | 211/60.1 |
| 7,232,168 B2 | 6/2007 | Orefice | |
| 7,530,537 B2 | 5/2009 | Kandah | |
| 7,621,305 B2 | 11/2009 | Cho | |
| 7,735,791 B2 * | 6/2010 | Bury | 248/205.5 |
| 7,975,972 B1 * | 7/2011 | Hajianpour | 248/205.5 |
| 8,042,229 B2 * | 10/2011 | Wang | 16/270 |
| 8,047,492 B2 * | 11/2011 | Wang | 248/307 |
| 8,177,079 B2 * | 5/2012 | Schwartzkopf et al. | 211/103 |
| 8,333,354 B2 * | 12/2012 | Tooley et al. | 248/206.2 |
| 2002/0144962 A1 * | 10/2002 | Dettorre et al. | 211/85.7 |
| 2007/0068887 A1 * | 3/2007 | Richard Nawrocki | 211/70.6 |
| 2007/0090252 A1 * | 4/2007 | Chou | 248/304 |
| 2007/0251904 A1 * | 11/2007 | Winig et al. | 211/106.01 |
| 2008/0093518 A1 | 4/2008 | Roth | |
| 2011/0036963 A1 * | 2/2011 | Castellanos | 248/534 |
| 2011/0272371 A1 * | 11/2011 | Pettifer | 211/85.15 |
| 2012/0074083 A1 * | 3/2012 | Geils | 211/85.7 |

\* cited by examiner

BAG RACK SYSTEM

CROSS-REFERENCE TO PRIOR APPLICATION

This application claims priority to Provisional Patent Application No. 61/398,874, filed on Jul. 6, 2010, which is incorporated herein by reference.

TECHNICAL FIELD

The present invention relates to a bag rack system and particularly to a portable bag rack system for maintaining a bag in an open position.

SUMMARY OF THE INVENTION

It is a feature of an embodiment of this invention to provide a portable bag rack system positioned relative to an object for supporting a bag in an open position. A first and a second bracket spaced from each other and the first bracket includes a base and an arm and the second bracket includes a base and an arm. Each of the first and second bracket bases are releasably mountable between one of a top mount position, a bottom mount position, or a vertical mount position. Each of the first bracket arm and the second bracket arm are releasably secured relative to the respective first base and second base. Each of the first bracket arm and the second bracket arm has a cleating structure.

It is another feature to provide a portable bag rack system for maintain an open bag. A pair of brackets spaced from each other, each bracket includes a base and an elongated arm. Each base has a releasable attachment mechanism and a mounting block. The mounting block includes a channel circumscribing the block. The attachment mechanism allows each base to be releasably secured and oriented to a top surface, bottom surface, or vertical surface. Each elongated arm includes a proximate end and an opposing distal free end with two or more cleats therebetween. The proximate end of the elongated arm has a hook structure. The hook structure of the elongated arm is releasably received in at least a portion of the block channel of the base thereby securing the elongated arm to the base.

It is still another feature to provide a portable bag rack system with multiple orientations to maintain a bag in an open position. A pair of brackets spaced from each other. Each bracket includes a base and an arm. Each arm is repositionable relative to the orientation of the respective base. Each base has a releasable attachment mechanism and a mounting block. Each respective mounting block includes a first, second, third, and fourth channel. Each respective base is repositionable into a first orientation, second orientation, and a third orientation with respect to the respective arm. Each elongated arm has a proximate end and an opposing distal free end with cleating structure extending at least partially therebetween. The proximate end of the elongated arm has a hook structure. The hook structure for each respective arms is repositionable within at least a portion of the first, second, third, and fourth channels of the mounting block when in the first, second, and third orientations.

Still another feature to provide a portable bag rack system with a first adaptor and a second adaptor. A first support arm removably affixed to the first adaptor. A second support arm removably affixed to the second adaptor. Each of the first and second support arms has a bag receiving channel formed in a side surface.

DETAILED DESCRIPTION

It is to be understood that the invention is not limited in its application to the details of construction and the arrangement of components set forth in the following description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," "in communication with" and "mounted," and variations thereof herein are used broadly and encompass direct and indirect connections, couplings, and mountings. In addition, the terms "connected" and "coupled" and variations thereof are not restricted to physical or mechanical connections or couplings.

Furthermore, and as described in subsequent paragraphs, the specific mechanical configurations illustrated in the drawings are intended to exemplify embodiments of the invention and that other alternative mechanical configurations are possible.

Figure 1:
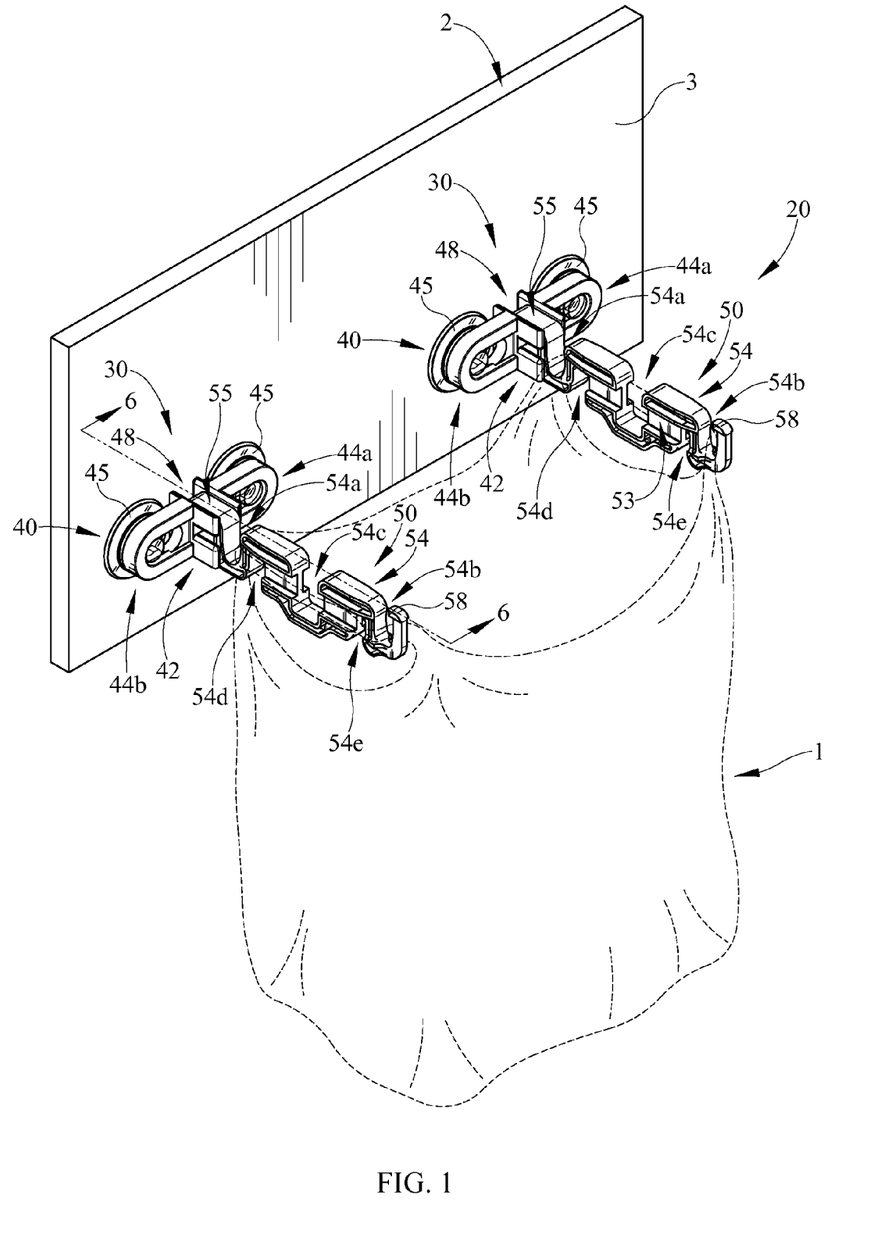
FIG. 1 shows a top perspective view of an embodiment of the bag rack system with an open bag, illustrating the bag rack system secured against a vertical surface.

As shown in FIG. 1, the bag rack system 20 includes a pair of equal or non-equal components/brackets 30 in a spaced relationship for hanging a bag 1 by its handles in an open position for filling or holding materials. It should be understood that the brackets 30, pair of bases 40, arms 50, or combinations thereof may be integral. The user is able to selectively orient the bag rack system 20 in a variety of positions to meet the user's desired application. For instance, the user can releasably secure the system 20 on a top, bottom, or vertical surface and maintain the open position of the bag.

In the embodiment shown, the brackets 30 are structurally equal, only one will be described in detail. It should be understood that the bag rack system, in its entirety or individual components thereof, may be made of a variety of materials or combinations of materials such as, but not limited to, plastic, wood, and metal and constructed by a variety of methods such as, but not limited to, injection or compression molding.

Figure 2:
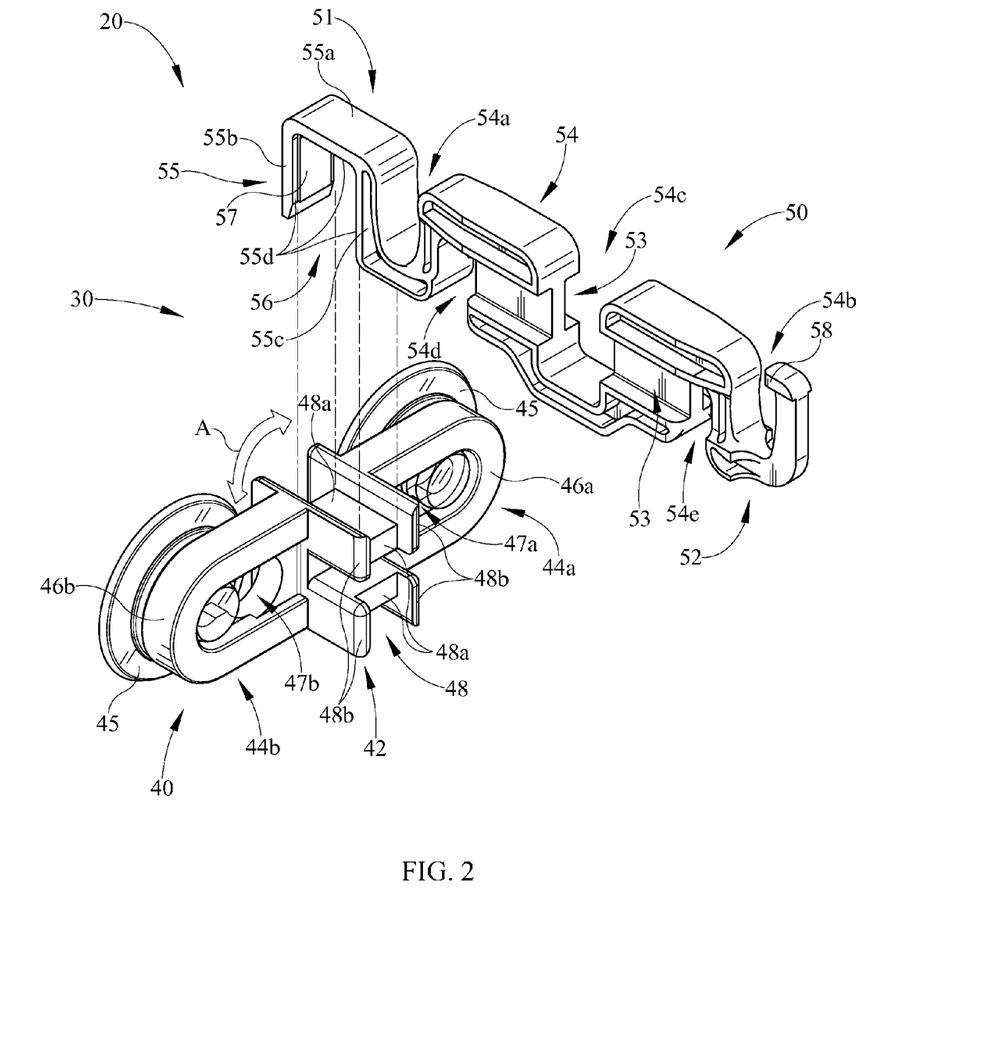
FIG. 2 shows a top perspective view of the embodiment of FIG. 1, with the arm exploded away from the base of the system, illustrating the arm in a disengaged position from the base.
Figure 3:
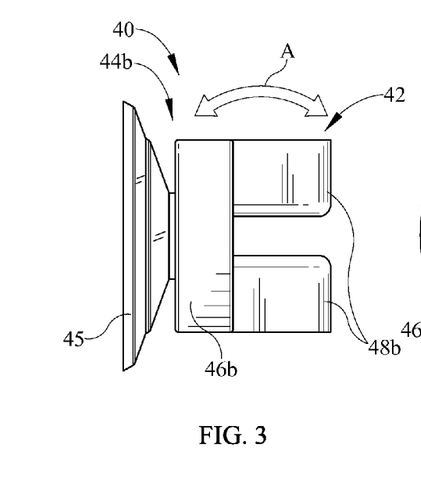
FIG. 3 shows a side view of the base embodiment of FIG. 2.
Figure 4:
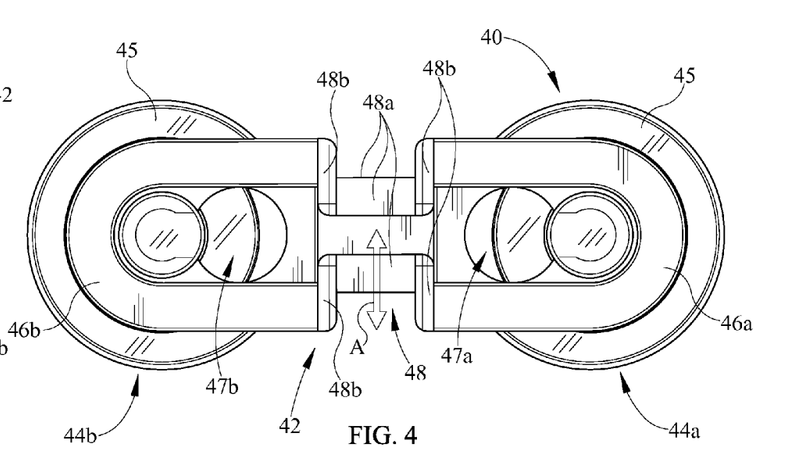
FIG. 4 shows a front view of the base embodiment of FIG. 2.
Figure 5:
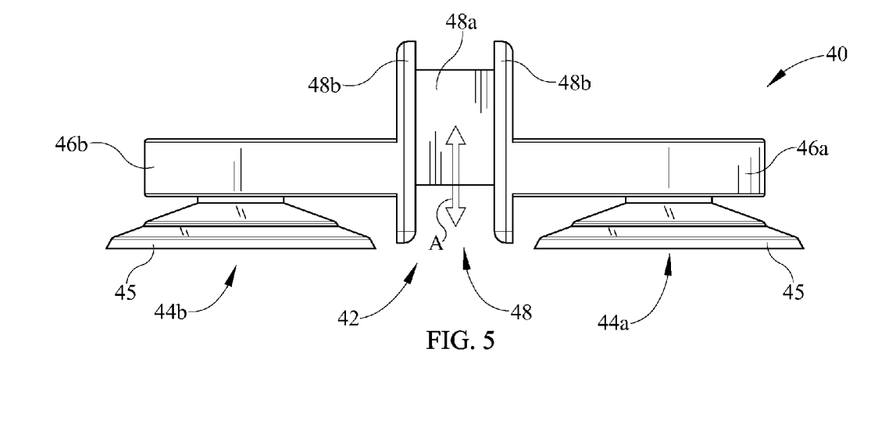
FIG. 5 shows a top or bottom view of the base embodiment of FIG. 2.
Figure 7:
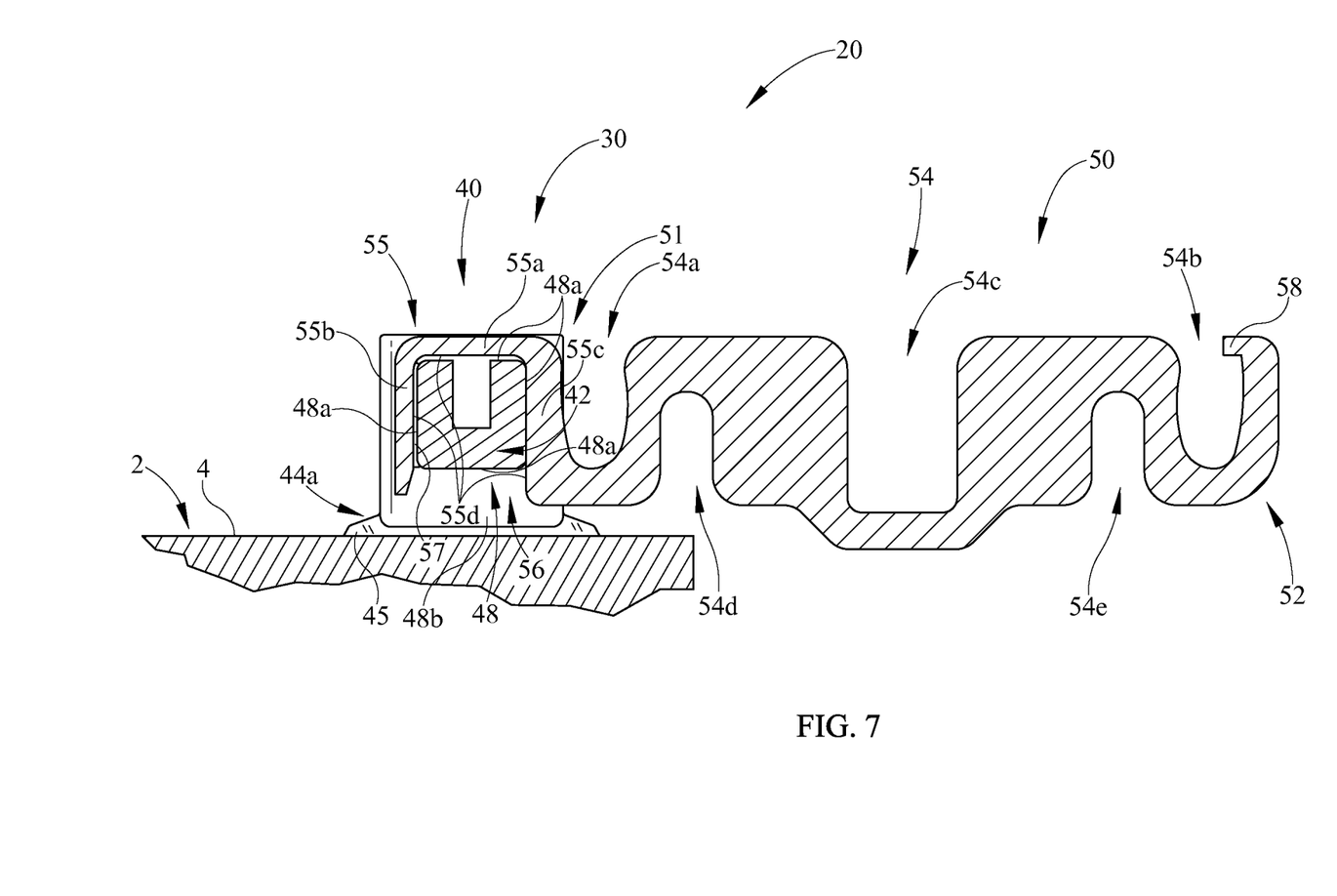
FIG. 7 shows a sectional view of the bag rack system of FIG. 6, illustrating the bag rack system in another orientation and secured against a top surface and the arm being repositioned and engaged to the base after being previously disengaged as in FIG. 2.
Figure 8:
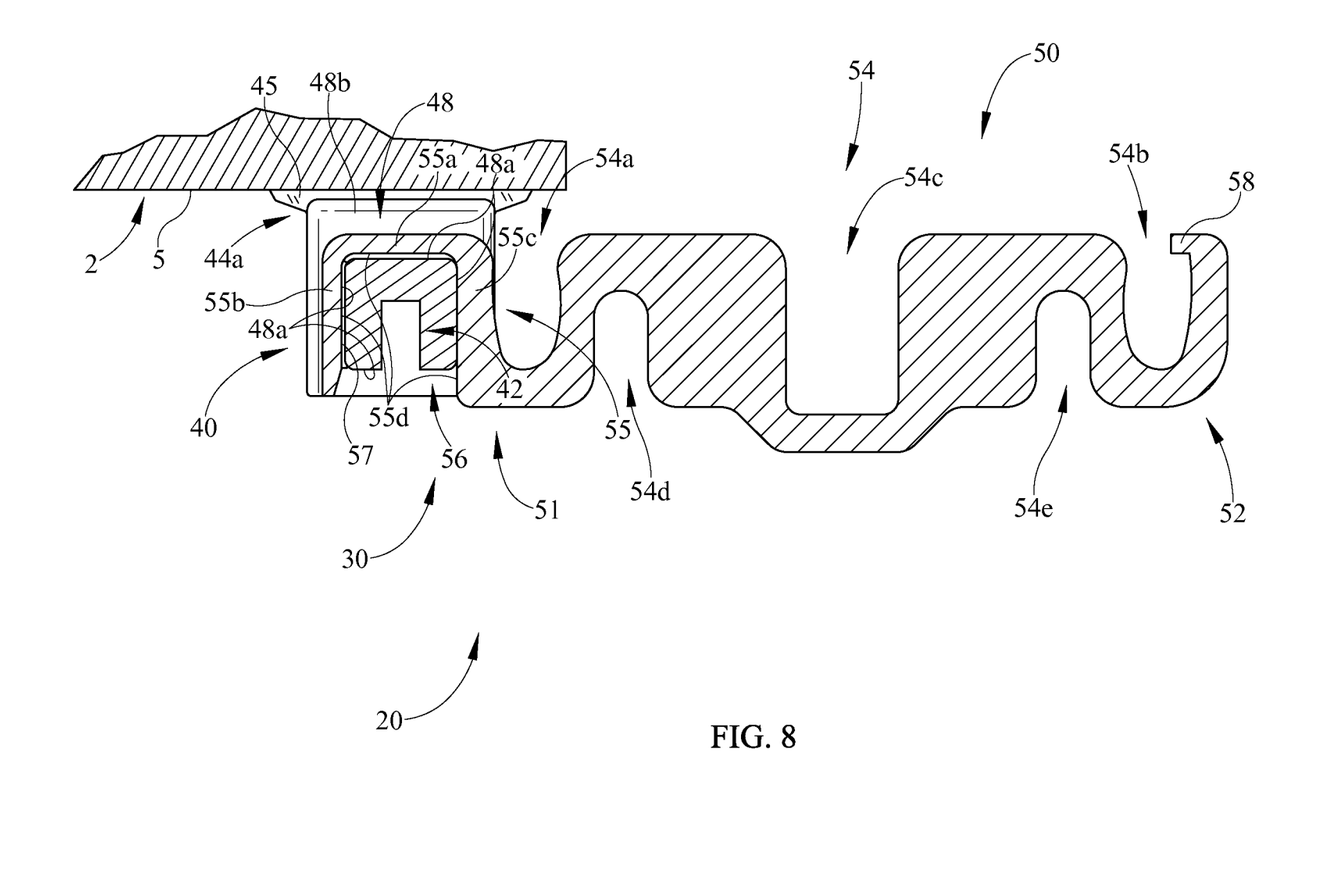
FIG. 8 shows a sectional view of the bag rack system of FIG. 6, illustrating the bag rack system in another orientation and secured against a bottom surface and the arm being repositioned and engaged to the base after being previously disengaged as in FIG. 2.
Figure 9:
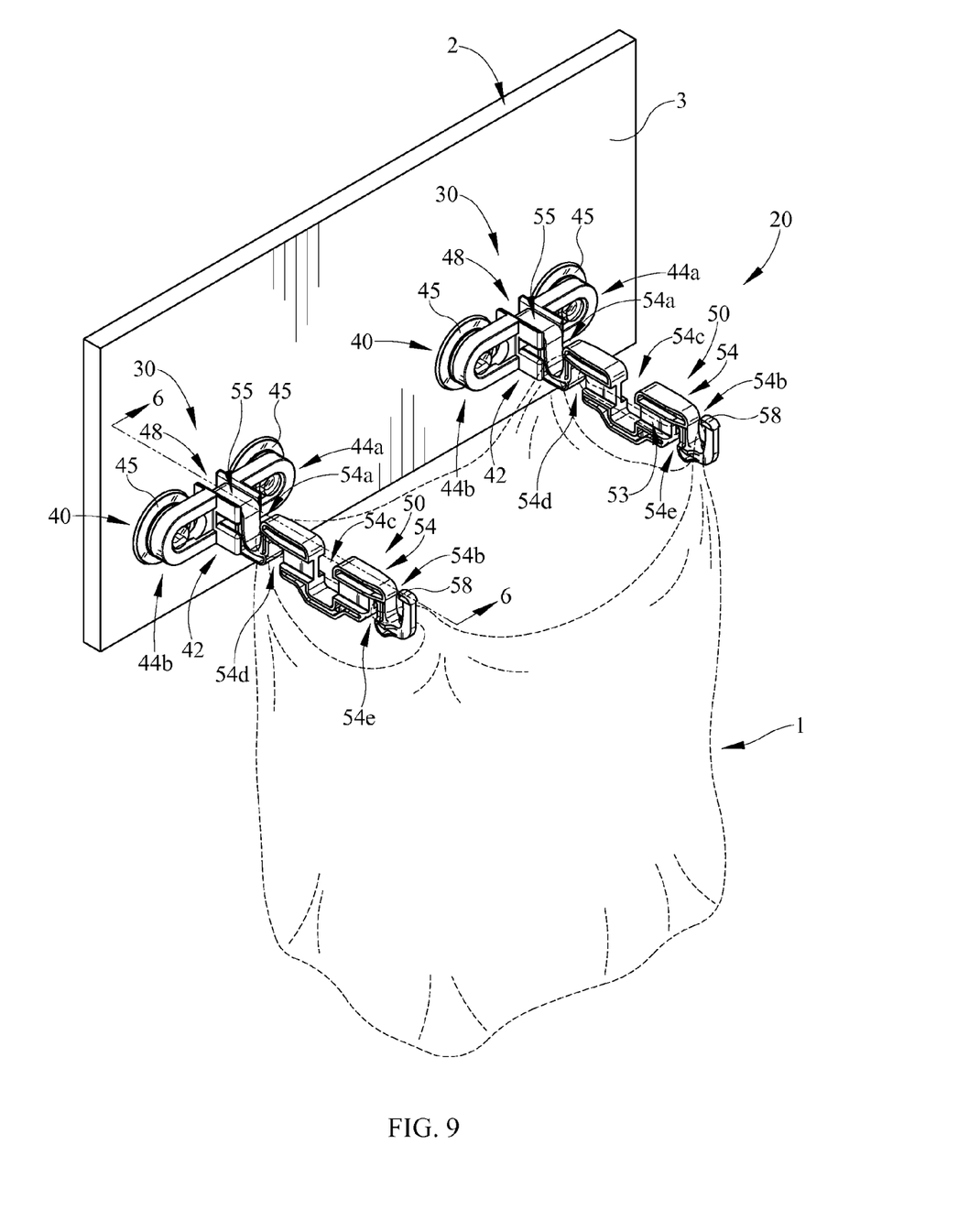
FIG. 9 shows a top perspective view of the embodiment of FIG. 1, illustrating another pattern of the bag handles secured within the cleating structure and channel of the arms.

The present embodiment as shown in FIGS. 1-9 enables the user to selectively position the bag rack system 20 in multiple orientations depending on the application. Each bracket 30 includes a base or adaptor 40 with an elongated arm 50 extending therefrom. The arm 50 includes a proximate end 51 and a distal free end 52. A cleating structure 54 between the distal free end 52 and the proximate end 51 of the arm 50 receives the handles of the bag 1. Specifically, spaced U-shaped notches or channels 54*a, b, c, d*,and *e* hold the bag in the open position. As shown in FIG. 1, the pair of U-shaped notches 54*a, b* may be spaced apart from each other by about 3.75 inches, the distance may help to maintain the handle strength integrity as well as hold the bag open for easy removal of material or depositing of trash. As shown in FIG. 9, another pattern of the bag handle is threaded into notches 54, *a, b, d*,and *e* locking or securing the bag into position. The loop of the bag 1 is wrapped over and through the upper notches 54*a, b* and further wrapped around the lower edge of the arm and through the lower notches 54*d*,and *e*. Further illustrated in FIGS. 1 and 9, a longitudinal channel or bag receiving channel 53 receives, guides, or holds a portion of the bag handle in position between notches. The longitudinal channel 53 extends along one or more lateral arm surfaces between the proximate and distal ends 51, 52 of the arm 50 and guides/retains the bag handle between the U -shaped notches. The center U-shaped notch or channel 54*c* extends past or below the pair of spaced U-shaped notches 54*a, b* thereby allowing the user to insert a finger or thumb to assist in removal of the bag 1. The distal free end 52 may also include an end hook or tab 58. The end hook 58 longitudinally extends across a portion of the U-shaped notch 54*b* and assists in locking the bag handle to the arm and threading the bag handle into the cleating structure 54. Further, the longitudinal channel 53 extends along one or more lateral arm surfaces between the proximate and distal ends 51, 52 of the arm 50 and guides/retains the bag handle between the U -shaped notches. Although not shown, the bag handle can be threaded into the arm in a variety of patterns including a zigzag fashion through the notches 54*a, b, c, d*, and *e* of the cleating structure 54. The proximate end 51 of the arm 50 includes a hook structure 55. The hook structure 55 has a top wall 55*a* interconnecting a pair of opposing sidewalls 55*b, c* defining a U-shaped notch 56 in the bottom edge of the arm or the edge opposite the U-shaped notches 54*a, b, c* described above. In use, the hook structure 55 releasably engages the arm 50 with the base 40 between multiple locked or engaged positions (FIGS. 1 and 6-9) and a disengaged position (FIG. 2). When the arm hook structure 55 is in the engaged position with the base 40, the arm cannot rotate relative to the base until separated or disengaged. Further, the inner surfaces 55*d* of the hook structure 55 may have a pad or frictional-fit structure 57 made of, but not limited to, rubber to assist in securing the arm 50 with the base 40 when in the engaged positions.

Figure 6:
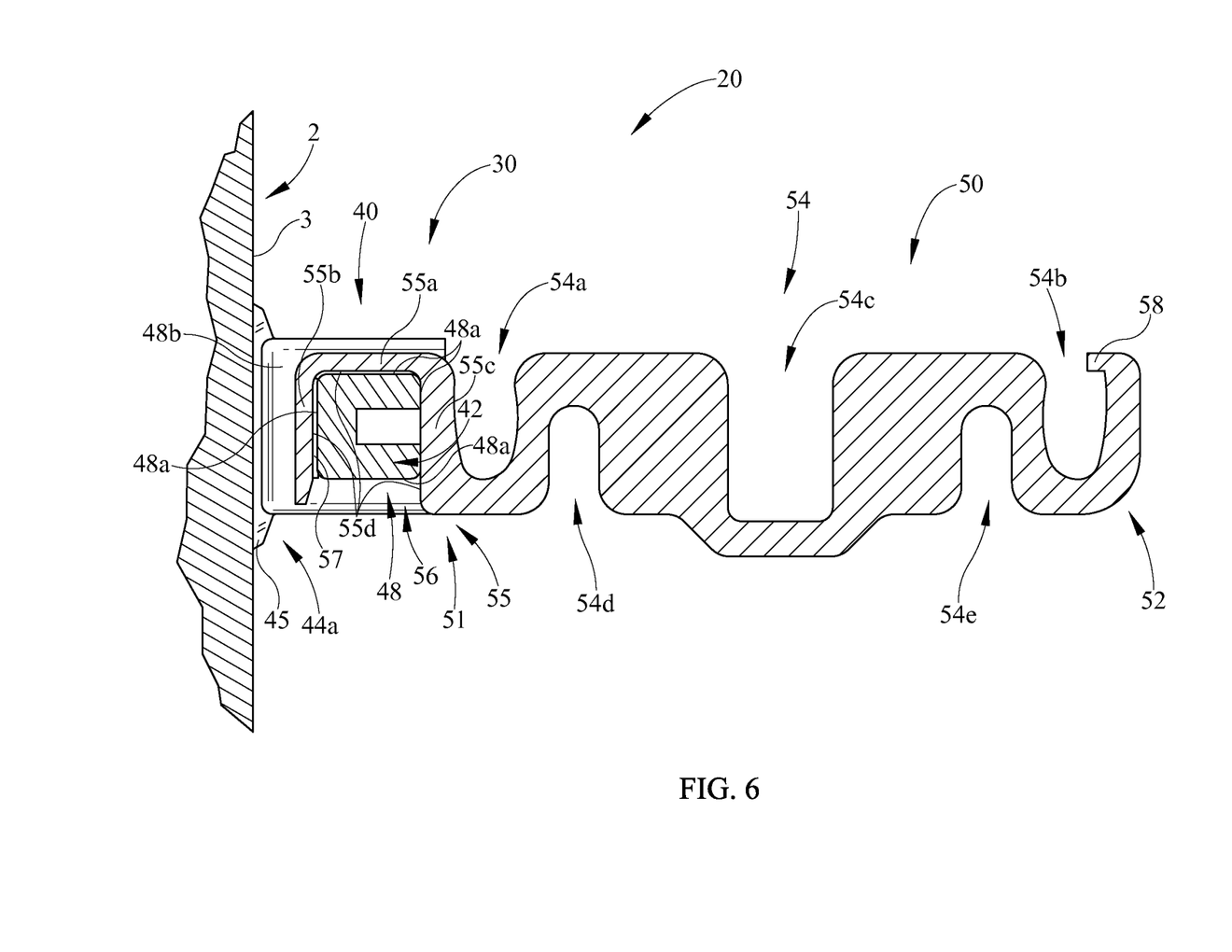
FIG. 6 shows a sectional view of the bag rack system of FIG. 1 taken along line 6-6, illustrating the bag rack system in one orientation and secured against a vertical surface and the arm in the engaged position.

As shown in FIGS. 1-9, the base 40 is adapted to be secured to a desired object 2 in a variety of orientations depending on the application. As desired by the user or application, the base 40 can be orientated on and releasably attached to a vertical surface 3 (FIGS. 1, 6, and 9), a top surface 4 (FIG. 7), or a bottom surface 5 (FIG. 8). Each base 40 includes a mounting block 42. The mounting block 42 engages with the hook structure 55 of the arm 50 to position the arm 50 in a substantially horizontal position to maintain the open bag 1 regardless of the orientation of the base 40. The base 40 further includes an attachment mechanism 44*a, b* releasably securing the base 40 and thus the bag rack system 20 to an object 2 in the desired orientation. Alternatively, it is understood that the attachment mechanism may be fixedly secure to the object. The attachment mechanism 44*a, b* is shown as a pair of suction-cups 45 received within a pair of opposing tabs 46*a, b* extending from the mounting block 42. Each tab 46*a, b* has a narrowing, slotted aperture 47*a, b* allowing the suction-cup 45 to pass through and laterally engage the tab 46*a, b*. Although the attachment mechanism 44*a, b* is specifically shown as a pair of suction cups 45 it should be understood that a variety of attachment mechanisms may be used such as, but not limited to, magnets, chemicals such as adhesives, or other mechanical structure. The mounting block 42 is substantially square shaped allowing the hook structure 55 to receive the block 42 in its various orientations while still maintaining its horizontal position. Further the mounting block 42 may include a groove or channel 48 receiving the arm hook structure 55. The channel 48 circumscribes the outer periphery of the base mounting block 42 in the direction A that the arm 50 or base 40 is moved/rotated between its multiple orientations. The channel 48 creates a plurality of channels within the surfaces surrounding the block 42. The channel 48 creates inner block walls 48*a* and outer block walls 48*b*. As shown in the figures, the height of the outer block walls 48*b* from the inner block walls 48*a* may be greater than the thickness of the hook structure 55 or walls 55*a, b*,or *c* providing a clearance from the object 2 to allow for surface mounting. Stated alternatively, the height of the channel walls is greater than the thickness of the hook structure. The outer block walls 48*b* or hook structure 55 may have tapered edges that direct the hook structure 55 into the channel. The inner block walls 48*a* or bottom wall of the channel 48 are substantially square in shape and are received and directly contact the inner surfaces 55*d* or pad 57 of the arm hook structure 55 preventing the arm 50 from rotating when engaged with the base 40. Further, the outer block walls 48*b* laterally maintain the hook structure 55 of the arms 50.

As shown in FIG. 1, each bracket 30 may be releasably fixed to a variety of vertical surfaces 3 such as but not limited to an inside or outside of a cabinet or refrigerator face. In vertical use (FIG. 1), the user presses the suction-cups 45 of each base 40 with the arm 50 already extending perpendicular from the front face of the base 40 in their spaced relationship to hold an open bag 1. In repositioning the bag rack system 20 to a top or bottom surface mount or position as desired by the user or application, FIGS. 7 and 8 respectively, the user can disengage each base 40 from the vertical surface 3 of the object 2 and then subsequently disengage the arm hook structure 55 (FIG. 2) thereby allowing the user to rotate and engage the arm 50 to the mounting block 42 or more specifically the mounting block channel 48 to extend perpendicular from the top or bottom surface of the base. The user may then engage each base 40 in their spaced relationship to the top or bottom surfaces 4, 5 of the object 2 while maintaining the arms 50 in the horizontal position to hold open the bag 1.

As shown in FIGS. 6 and 7, the arm 50 may be disengage from or engaged with the mounting block 42 when the base 40 is releaseably secured to the vertical surface 3 (FIG. 6) or the top surface 4 (FIG. 7) of the object 2. It should be understood that the arm 50 may or may not be engaged or disengaged from the base 40 as such as shown in FIG. 8 when the base is releasably secured to the bottom surface 5 (FIG. 8) of the object 2. The clearance or distance between the bottom surface 5 of the object 2 and the mounting block 42 may or may not allow the removal or attachment of the arm 50 when the base is secured to the object.

It is important to note that the construction and arrangement of the elements of the bag rack system as shown in the exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited in the claims. Further, elements shown as integrally formed may be constructed of multiple parts or elements, the position of elements may be reversed or otherwise varied, and the nature or number of discrete elements or positions may be altered or varied. Accordingly, all such modifications are intended to be included within the scope of the appended claims. The order or sequence of any process or method steps may be varied or re-sequenced according to alternative embodiments. Other substitutions, modifications, changes and omissions may be made in the design, operating conditions and arrangement of the various exemplary embodiments without departing from the scope of the appended claims.

The foregoing detailed description is given primarily for clearness of understanding and no unnecessary limitations are to be understood therefrom for modifications will become obvious to those skilled in the art upon reading this disclosure and may be made without departing from the spirit of the invention and scope of the appended claims.

I claim:

1. A portable bag rack system positioned relative to an object for supporting a bag in an open position comprising:
   a first and a second bracket spaced from each other, wherein said first bracket includes a base and an arm and wherein said second bracket includes a base and an arm;
   wherein each of said first bracket base and said second bracket base are releasably mountable between a top mount position, a bottom mount position, and a vertical mount position;
   each said first bracket base and said second bracket base includes a block with corresponding outer peripheral sides, wherein each said respective arm engages two opposing said outer peripheral sides of said block and at least one of said outer peripheral sides interconnecting said two opposing outer peripheral sides;
   wherein each of said first bracket arm and said second bracket arm are releasably secured relative to said respective first base and said second base; and
   each said first bracket arm and said second bracket arm has a cleating structure.

2. The portable bag rack system as in claim 1 wherein each of said first bracket base and said second bracket base includes an attachment mechanism.

3. The portable bag rack system as in claim 2 wherein said attachment mechanism is a suction-cup mechanism.

4. The portable bag rack system as in claim 1 wherein said first bracket arm and said second bracket arm includes a substantially U-shaped end to releasably engage said block of said respective first bracket base and said second bracket base.

5. The portable bag rack system as in claim 4 wherein an interior surface of each of said arm U-shaped ends includes a friction pad.

6. The portable bag rack system as in claim 1 wherein said block outer peripheral sides are a bottom wall of a channel.

7. The portable bag rack system as in claim 6 wherein each arm is received within said channel of said respective mounting block.

8. A portable bag rack system for maintaining an open bag comprising:
   a pair of brackets spaced from each other, each said bracket includes a base and an elongated arm;
   each said base having a releasable attachment mechanism and a mounting block, said mounting block includes a channel circumscribing 360 degrees about a plurality of exterior surfaces of said block, said attachment mechanism allows each said base to be releasably secured and oriented to a top surface, bottom surface, and vertical surface;
   each said elongated arm including a proximate end and an opposing distal free end with two or more cleats therebetween, said proximate end of said elongated arm having a hook structure; and
   wherein said hook structure of said elongated arm is releasably received in at least a portion of said block channel of said base thereby securing said elongated arm to said base.

9. The portable bag rack system as in claim 8 wherein said channel has a depth greater than the thickness of said hook structure.

10. The portable bag rack system as in claim 8 wherein said hook structure of said elongated arm includes a top wall and depending opposing sidewalls.

11. The portable bag rack system as in claim 10 wherein at least a portion of said channel of said block receives said top wall and said opposing sidewalls of said elongated arm.

12. The portable bag rack system as in claim 8 wherein said elongated arm includes a longitudinal groove extending at least a portion of the distance between said proximate and distal free ends.

13. The portable bag rack system as in claim 8 wherein said base includes a pair of opposing tabs extending from said mounting block, each said tab contains said attachment mechanism.

14. The portable bag rack system as in claim 13 wherein said attachment mechanism is a suction-cup.

15. The portable bag rack system as in claim 8 wherein said base mounting block is square and said channel circumscribes substantially the periphery of said base mounting block.

16. A portable bag rack system with multiple orientations to maintain a bag in an open position, comprising:
   a pair of brackets spaced from each other, each said bracket including a base and an arm, each of said arms being repositionable relative to the orientation of said respective base;
   each of said bases having a releasable attachment mechanism and a mounting block, wherein each of said respective mounting blocks includes a first, second, third, and fourth channel, each of said respective bases repositionable into a first orientation, second orientation, and a third orientation with respect to said respective arm;
   each of said elongated arms having a proximate end and an opposing distal free end with cleating structure extending at least partially therebetween, said proximate end of said elongated arm having a hook structure; and
   said hook structure for each of said respective arms being repositionable within and engages three mounting block channels of said first, second, third, and fourth channels when in said first, second, and third orientations, wherein said three mounting block channels are different when in each said first, second, and third orientations.

17. The portable bag rack system as in claim 16 wherein said mounting block is substantially square in shape.

18. The portable bag rack system as in claim 17 wherein said channels circumscribe the outer periphery of said mounting block.

19. The portable bag rack system as in claim 18 wherein said hook structure engages at least three surfaces when in each said first, second, and third orientations, each surface of said at least three surfaces is within a different channel of said three mounting block channels.

20. The portable bag rack system as in claim 16 wherein said hook structure of said elongated arm includes a top wall interconnecting opposing sidewalls.

21. The portable bag rack system as in claim 16 wherein one or more lateral sides of each said elongated arm includes a longitudinal channel.

* * * * *